US012212090B2

(12) United States Patent
Lee et al.

(10) Patent No.: US 12,212,090 B2
(45) Date of Patent: Jan. 28, 2025

(54) ELECTRICAL CONNECTOR

(71) Applicant: ACES ELECTRONICS CO., LTD., Taoyuan (TW)

(72) Inventors: Kuang-En Lee, Taoyuan (TW); Chung-Hsin Wu, Taoyuan (TW); Peng-Fei Sun, Taoyuan (TW)

(73) Assignee: ACES ELECTRONICS CO., LTD., Taoyuan (TW)

( * ) Notice: Subject to any disclaimer, the term of this patent is extended or adjusted under 35 U.S.C. 154(b) by 364 days.

(21) Appl. No.: 17/869,761

(22) Filed: Jul. 20, 2022

(65) Prior Publication Data

US 2023/0097243 A1 Mar. 30, 2023

(30) Foreign Application Priority Data

Sep. 24, 2021 (TW) ................................ 110211275

(51) Int. Cl.

*H01R 13/50* (2006.01)
*H01R 13/04* (2006.01)
*H01R 43/16* (2006.01)
*H01R 43/24* (2006.01)

(52) U.S. Cl.

CPC ............. *H01R 13/50* (2013.01); *H01R 13/04* (2013.01); *H01R 43/16* (2013.01); *H01R 43/24* (2013.01)

(58) Field of Classification Search

CPC ........ H01R 13/04; H01R 13/50; H01R 43/16; H01R 43/24
USPC .......................................................... 439/962
See application file for complete search history.

(56) References Cited

U.S. PATENT DOCUMENTS

| | | | | |
|---|---|---|---|---|
| 9,755,336 | B2 * | 9/2017 | Cheng | H01R 12/712 |
| 2017/0141495 | A1 * | 5/2017 | Cheng | H01R 13/6273 |
| 2020/0136293 | A1 * | 4/2020 | Zhao | H01R 13/405 |

FOREIGN PATENT DOCUMENTS

| | | | | |
|---|---|---|---|---|
| CN | 203733991 U | * 7/2014 | | |
| CN | 203967301 U | * 11/2014 | | |
| CN | 105470782 A | * 4/2016 | | H01R 12/724 |
| JP | 3941386 B2 | * 7/2007 | | |
| JP | 3156760 U | * 1/2010 | | |
| WO | WO-2011128774 A2 | * 10/2011 | | H01R 24/60 |

* cited by examiner

*Primary Examiner* — Peter G Leigh
(74) *Attorney, Agent, or Firm* — MUNCY, GEISSLER, OLDS & LOWE, P.C.

(57) ABSTRACT

An electrical connector includes a first terminal set including first terminals and first material bridges forming electrical connections between the first terminals, a second terminal set including second terminals and second material bridges forming electrical connections between the second terminals, and an insulating body formed on the first and second terminal sets by insert molding. The insulating body has a top surface thereof provided with first and second punching holes that expose the first and second material bridges for allowing a preset cutting tool to be used to cut the first and second material bridges and carry out waste removal, so that the first terminals and the second terminals are independent without producing electrical connections.

6 Claims, 7 Drawing Sheets

ELECTRICAL CONNECTOR

This application claims the priority benefit of Taiwan patent application number 110211275, filed on Sep. 24, 2021.

BACKGROUND OF THE INVENTION

1. Field of the Invention

The present invention relates to electrical connector technology, and more particularly to an electrical connector in which a plurality of first and second material bridges of a first terminal set and a second terminal set are designed into an upper and lower layer staggered structure, and in the process of insert molding, the preset cutting tool is used to cut the first and second material bridges at one time, and the waste is removed on the upper and lower sides of the plurality of cutting places, so that the terminals of the first terminal set and second terminal set are independent and do not produce electrical connections, hereby achieving the purpose of reducing the development and manufacturing time of a set of molds by half.

2. Description of the Related Art

Nowadays, the electronic industry is more and more widely used in daily life. For example: 3C industry, automotive electronics and various machines are equipped with electronic devices. The transmission method between the electronic devices is to provide a plurality of plug/socket electrical connectors on the internal printed circuit board, and the plug/socket electrical connectors have a plurality of conductive terminals. These conductive terminals are formed with an upper row terminal set and a lower row terminal set according to the electrical connector specifications, and then are electrically connected with the cables connected to the plug/socket electrical connectors, so that the electronic devices can transmit information or data to each other. The current electrical connector manufacturing method is to use different stamping dies for the upper row terminal set and the lower row terminal set, and different conductive sheet materials are cut into the aforementioned two terminal sets. After the two terminal sets are respectively bent, the two terminal sets are respectively placed in the mold to be embedded and injected or respectively embedded in the insulating base to form an electrical connector structure.

From the above, it is known that the conventional electrical connector manufacturing process has the following deficiencies: One is that the upper row terminal set and the lower row terminal set are manufactured separately, so it is necessary to develop different stamping dies independently, and then use the respective stamping dies to cut the conductive sheets into the upper row terminal set and the lower row terminal set respectively. The aforementioned manufacturing method requires the development of two different stamping dies, thereby increasing the die development cost and development time of the enterprise. The second is that the upper row terminal set and the lower row terminal set are respectively placed in different molds for insert molding operation, or the upper row terminal set and the lower row terminal set are fixed on the insulating base by inserting them into the insulating base respectively. The above-mentioned manufacturing methods will not only bring higher assembly costs to the enterprise, but also form complex manufacturing procedures and spend more manufacturing time.

Based on the above-mentioned various deficiencies of the conventional electrical connectors, it is necessary to make research and development improvements by those engaged in the industry, so as to form the effect of reducing the assembly cost, manufacturing process and manufacturing time of the electrical connector.

SUMMARY OF THE INVENTION

The present invention has been accomplished under the circumstances in view. It is therefore the main object of the present invention to provide an electrical connector, which comprises: a first terminal set, a second terminal set, and an insulating body. The first terminal set comprises a plurality of terminals and a plurality of first material bridges forming electrical connections between the terminals, and each terminal extends from the adjacent first material bridge to one side with a first welding portion and to the other side with a first connecting portion and then a first butting portion, and the first connecting portion is horizontally bent to provide a dodging space. The second terminal set comprises a plurality of terminals and a plurality of second material bridges forming electrical connections between the terminals, and each terminal extends from the adjacent second material bridge to one side with a second welding portion and to the other side with a second connecting portion and then a second butting portion. The second terminal set is disposed on the bottom side of the first terminal set at a distance from each other, and the second material bridges are located on the bottom side of the dodging spaces. The insulating body is formed by inserting the first terminal set and the second terminal set into the corresponding plurality of terminal slots by insert molding. The top surface of the insulating body is provided with a plurality of first punching holes that expose the first material bridges, and a plurality of second punching holes that are located on one side of the first punching holes and expose the second material bridges. Use a preset cutting tool to cut the first material bridges and the second material bridges simultaneously from top to bottom and carry out waste removal, so that the terminals of the first terminal set and second terminal set are independent and do not produce electrical connections, hereby achieving the purpose of reducing the development and manufacturing time of a set of molds by half.

Preferably, the insulating body comprises a horizontal portion with the top surface of the insulating body formed thereon to provide the first punching holes and the second punching holes, an extension block located on a bottom side of the horizontal portion and covering a partial area of the first welding portions and a partial area of the second welding portions, a row of waste grooves located on the extension block on a bottom side of said first punching holes, a waste area formed on a bottom side of the horizontal portion corresponding to the second punching holes, and a vertical portion bent downward from one side of the horizontal portion and provided with the terminal slots extending to the extension block for receiving the first terminals and the second terminals. The first butting portions of the first terminal set and the second butting portions of the second terminal set protrude from an outer wall of the vertical portion.

Preferably, the insulating body forms a recess outside the first punching holes, and the first punching holes are rectangular through holes.

Preferably, the second punching holes are round through holes.

Preferably, each first terminal of the first terminal set is bent and extended downward from the adjacent first material bridge to one side to form the respective first welding portion, and each first terminal of the first terminal set extends from the adjacent first material bridge to the other side with the respective first connecting portion. The first connecting portion is bent downward and extends horizontally to form the respective first butting portion. The end of the first butting portion forms an oval bead structure.

Preferably, each second terminal of the second terminal set is bent and extended downward from the adjacent second material bridge to one side to form the respective second welding portion, and each second terminal of the second terminal set extends from the adjacent second material bridge to the other side with the respective second connecting portion. The second connecting portion is bent downward and extends horizontally to form the second butting portion. The end of the second butting portion forms an oval bead structure.

DETAILED DESCRIPTION OF THE PREFERRED EMBODIMENT

Figure 1:
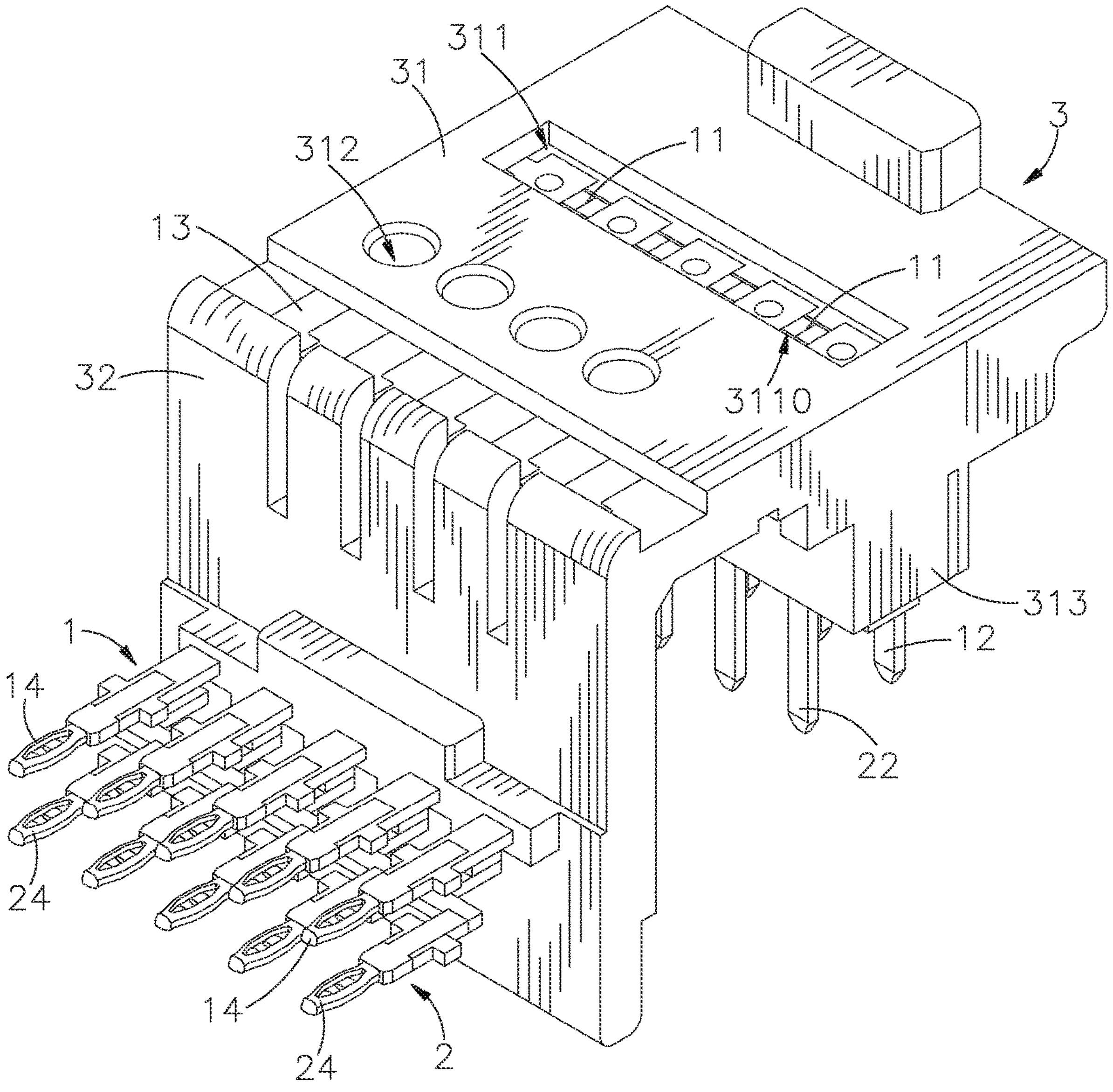
FIG. 1 is an oblique top elevational view of an electrical connector in accordance with the present invention.
Figure 2:
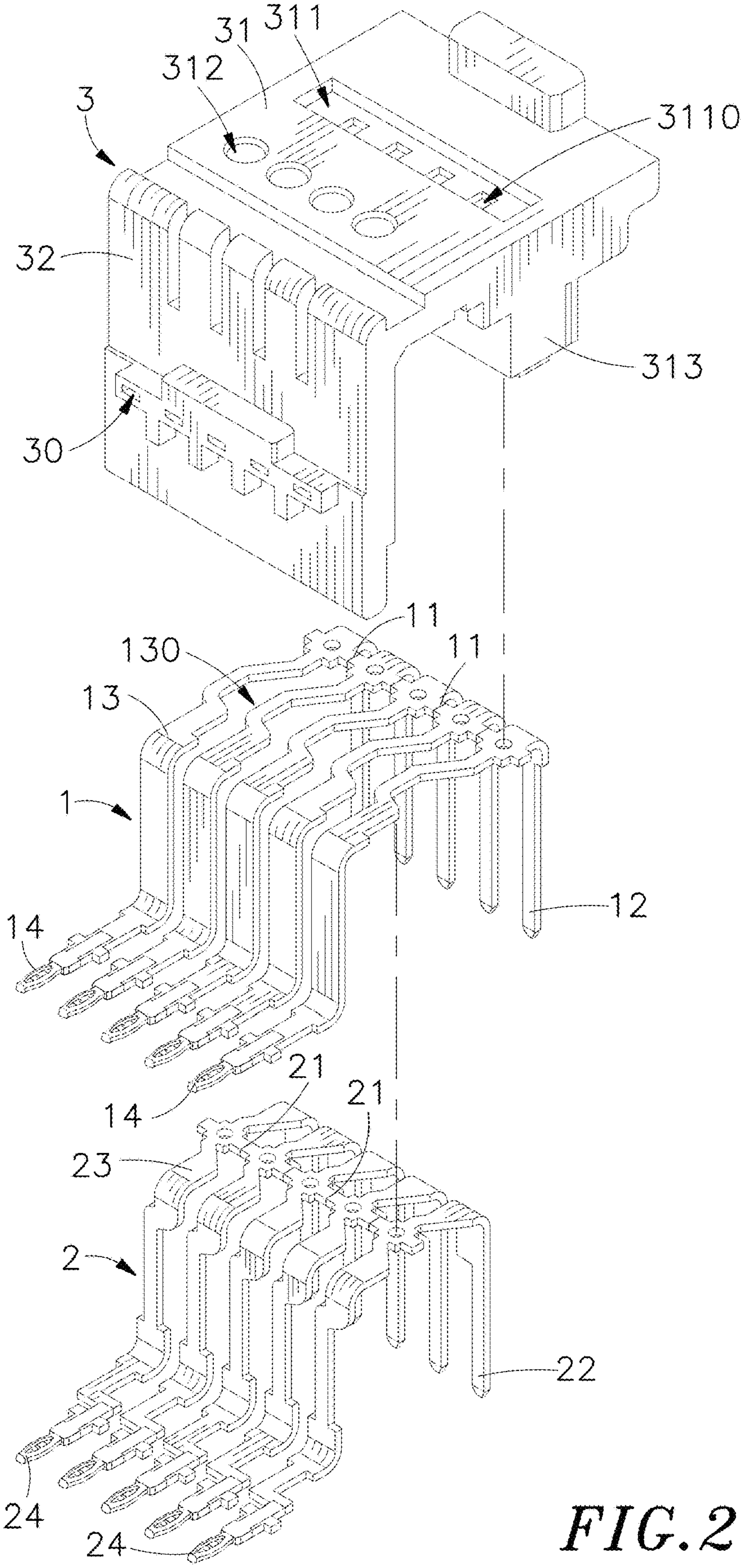
FIG. 2 is an exploded view of the electrical connector in accordance with the present invention.
Figure 3:
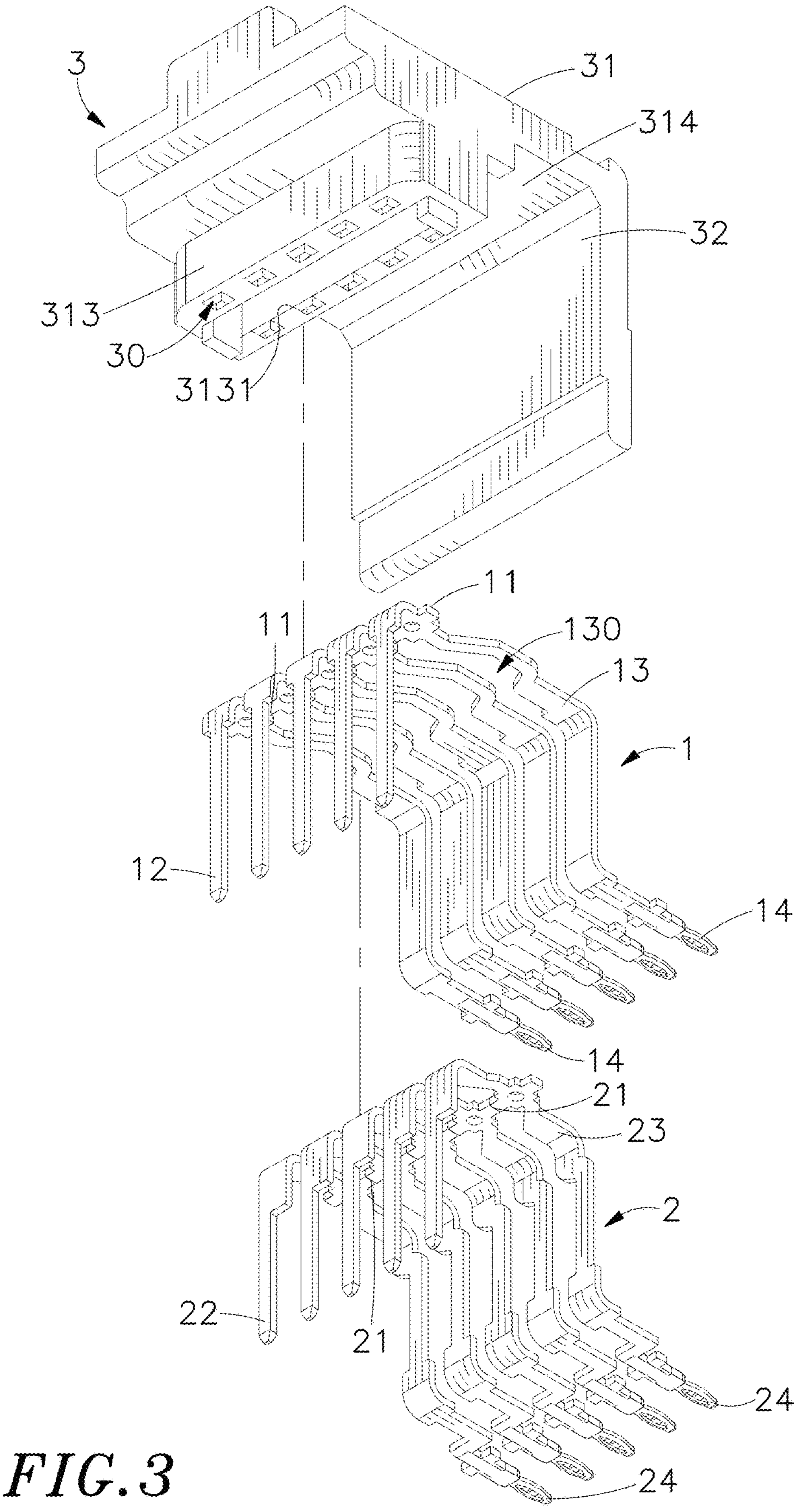
FIG. 3 corresponds to FIG. 2 when viewed from another angle.

Referring to FIGS. 1-3, where FIG. 1 is an oblique top elevational view of an electrical connector in accordance with the present invention, FIG. 2 is an exploded view of the electrical connector in accordance with the present invention, and FIG. 3 corresponds to FIG. 2 when viewed from another angle, as can be clearly seen from the figures, the electrical connector of the present invention comprises a first terminal set 1, a second terminal set 2 and an insulating body 3, and the detailed structure and connection relationship are as follows:

The first terminal set 1 comprises a plurality of terminals and a plurality of first material bridges 11 forming electrical connections between the terminals, and each terminal extends from the adjacent first material bridge 11 to one side with a first welding portion 12 and to the other side with a first connecting portion 13 and then a first butting portion 14, and the first connecting portion 13 is horizontally bent to provide a dodging space 130.

The second terminal set 2 comprises a plurality of terminals and a plurality of second material bridges 21 forming electrical connections between the terminals, and each terminal extends from the adjacent second material bridge 21 to one side with a second welding portion 22 and to the other side with a second connecting portion 23 and then a second butting portion 24. The second terminal set 2 is disposed on the bottom side of the first terminal set 1 at a distance from each other, and the second material bridges 21 are located on the bottom side of the dodging spaces 130.

The insulating body 3 is formed by inserting the first terminal set 1 and the second terminal set 2 into the corresponding plurality of terminal slots 30 by insert molding. The top surface of the insulating body 3 is provided with a plurality of first punching holes 3110 that expose the first material bridges 11, and a plurality of second punching holes 312 that are located on one side of the first punching holes 3110 and expose the second material bridges 21. Use a preset cutting tool (not shown in the figures) to cut the first material bridges 11 and the second material bridges 21 simultaneously from top to bottom and carry out waste removal, so that the terminals of the first terminal set 1 and second terminal set 2 are independent and do not produce electrical connections.

Each terminal of the above-mentioned first terminal set 1 is bent and extended downward from the adjacent first material bridge 11 to one side to form the first welding portion 12. Each terminal of the above-mentioned first terminal set 1 extends from the adjacent first material bridge 11 to the other side with the first connecting portion 13, the first connecting portion 13 is bent downward and extends horizontally to form the first butting portion 14, and the end of the first butting portion 14 forms an oval bead structure.

Each terminal of the above-mentioned second terminal set 2 is bent and extended downward from the adjacent second material bridge 21 to one side to form the second welding portion 22. Each terminal of the above-mentioned second terminal set 2 extends from the adjacent second material bridge 21 to the other side with the second connecting portion 23, the second connecting portion 23 is bent downward and extends horizontally to form the second butting portion 24, and the end of the second butting portion 24 forms an oval bead structure.

The above-mentioned insulating body 3 comprises a horizontal portion 31 and the first punching holes 3110 and the second punching holes 312 are arranged on the top surface of the horizontal portion 31. The bottom side of the horizontal portion 31 is protruded with an extension block 313 covering a partial area of the first welding portions 12 and a partial area of the second welding portions 22. The extension block 313 has a row of waste grooves 3131 on the bottom side of the first punching holes 3110. The bottom side of the horizontal portion 31 has a waste area 314 corresponding to the second punching holes 312. There is a vertical portion 32 bent downward from one side of the horizontal portion 31. The vertical portion 32 is provided with the terminal slots 30 extending to the extension block 313 and for receiving the terminals of the first terminal set 1 and the second terminal set 2. The first butting portions 14 of the first terminal set 1 and the second butting portions 24 of the second terminal set 2 protrude from the outer wall of the vertical portion 32. The insulating body 3 forms a recess 311 outside the first punching holes 3110. The first punching holes 3110 are rectangular through holes. The second punching holes 312 of the insulating body 3 are circular through holes.

Figure 4:
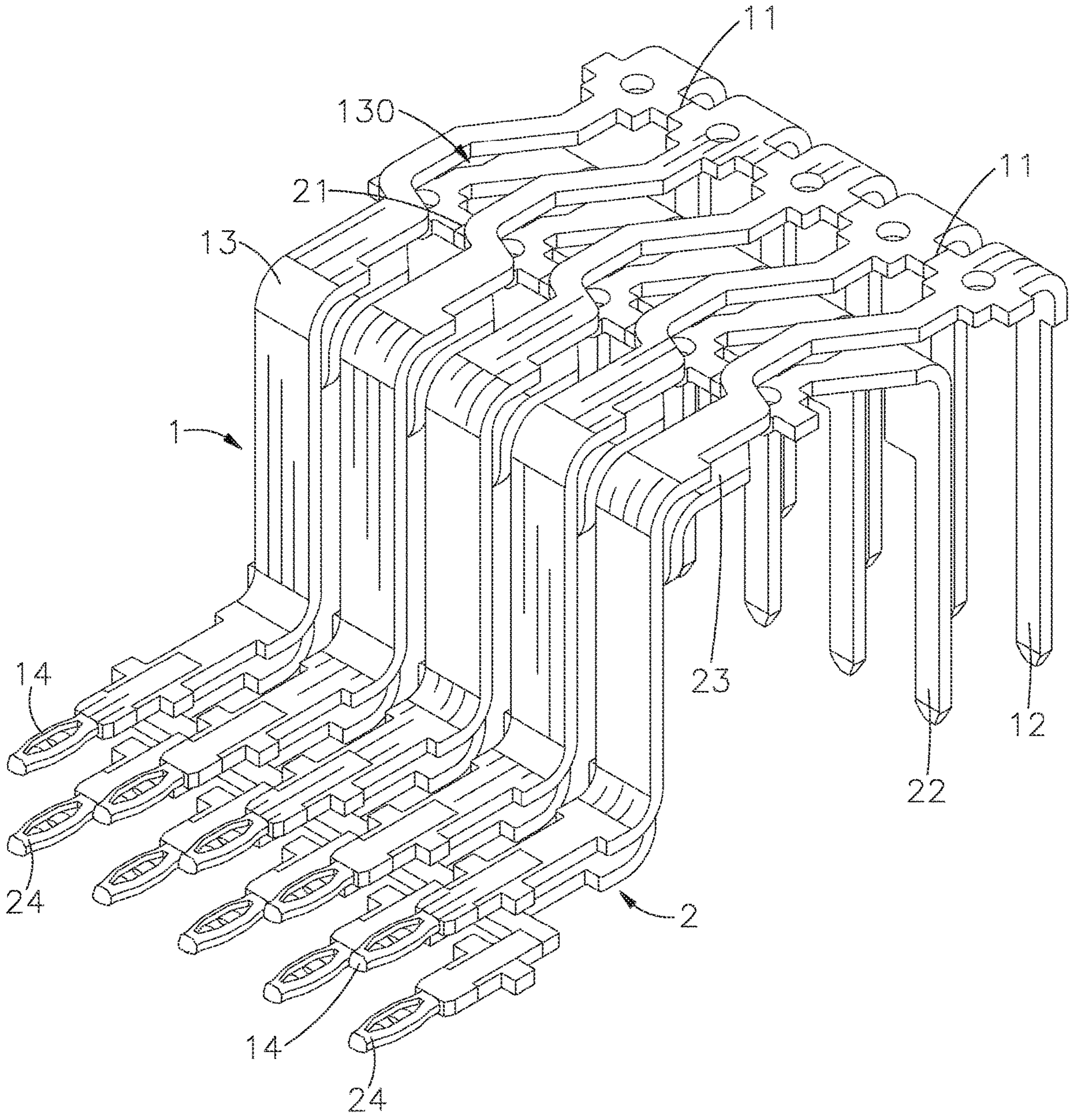
FIG. 4 is a fixed state diagram of the first and second terminal sets of the present invention before the insert molding.
Figure 5:
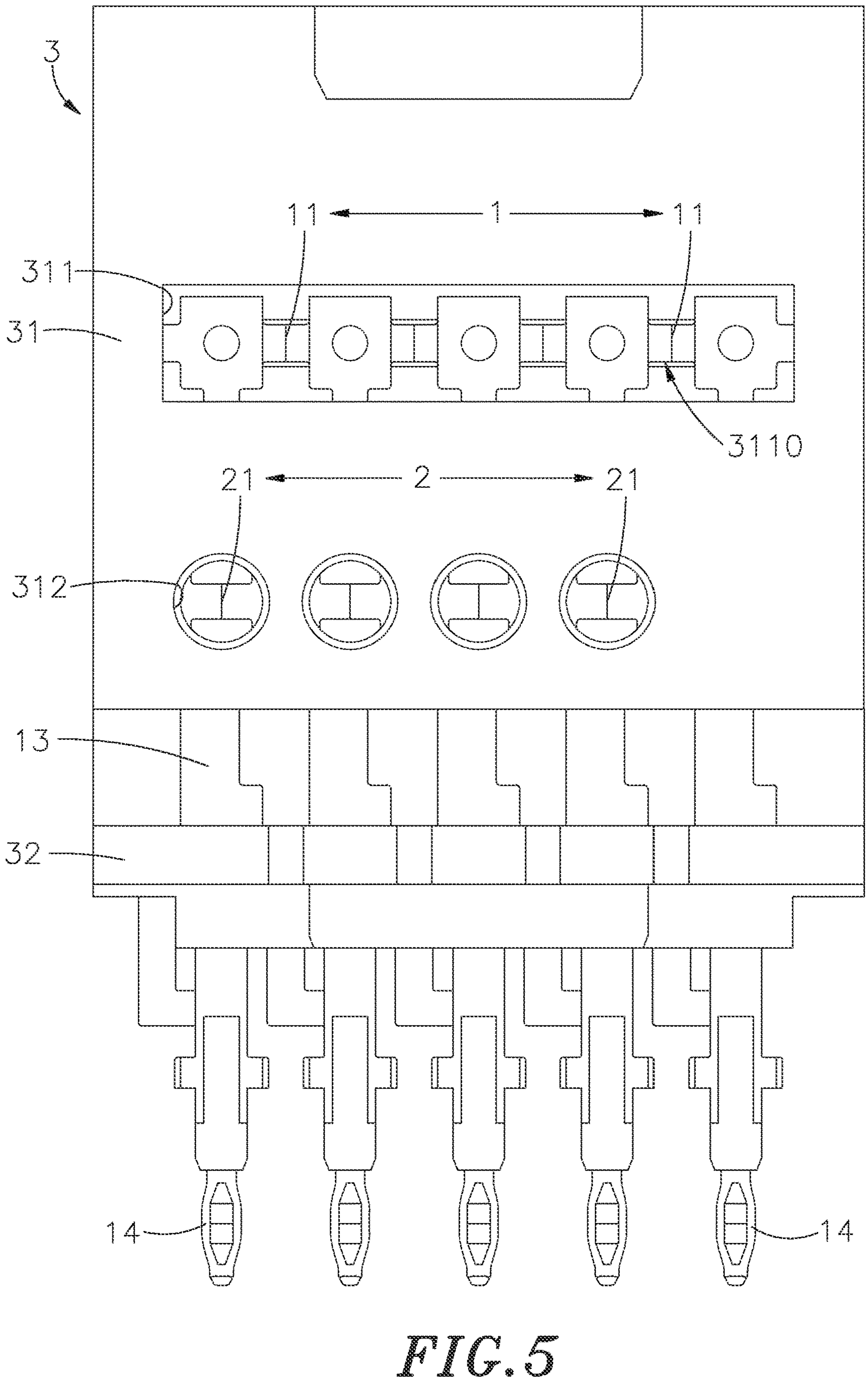
FIG. 5 is a top view of the electrical connector of the present invention before cutting the first and second material bridges.
Figure 6:
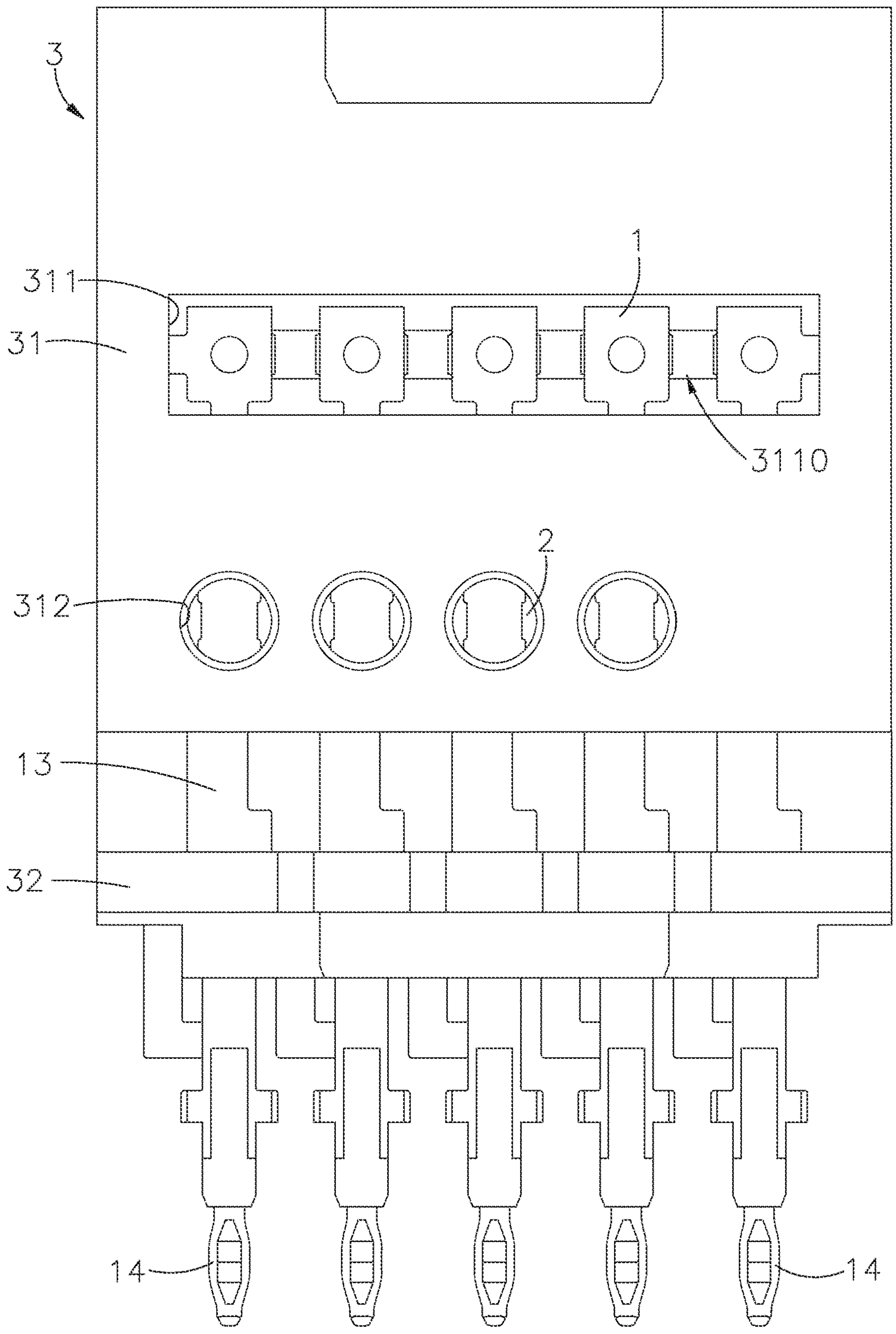
FIG. 6 is a top view of the electrical connector of the present invention after cutting the first and second material bridges.
Figure 7:
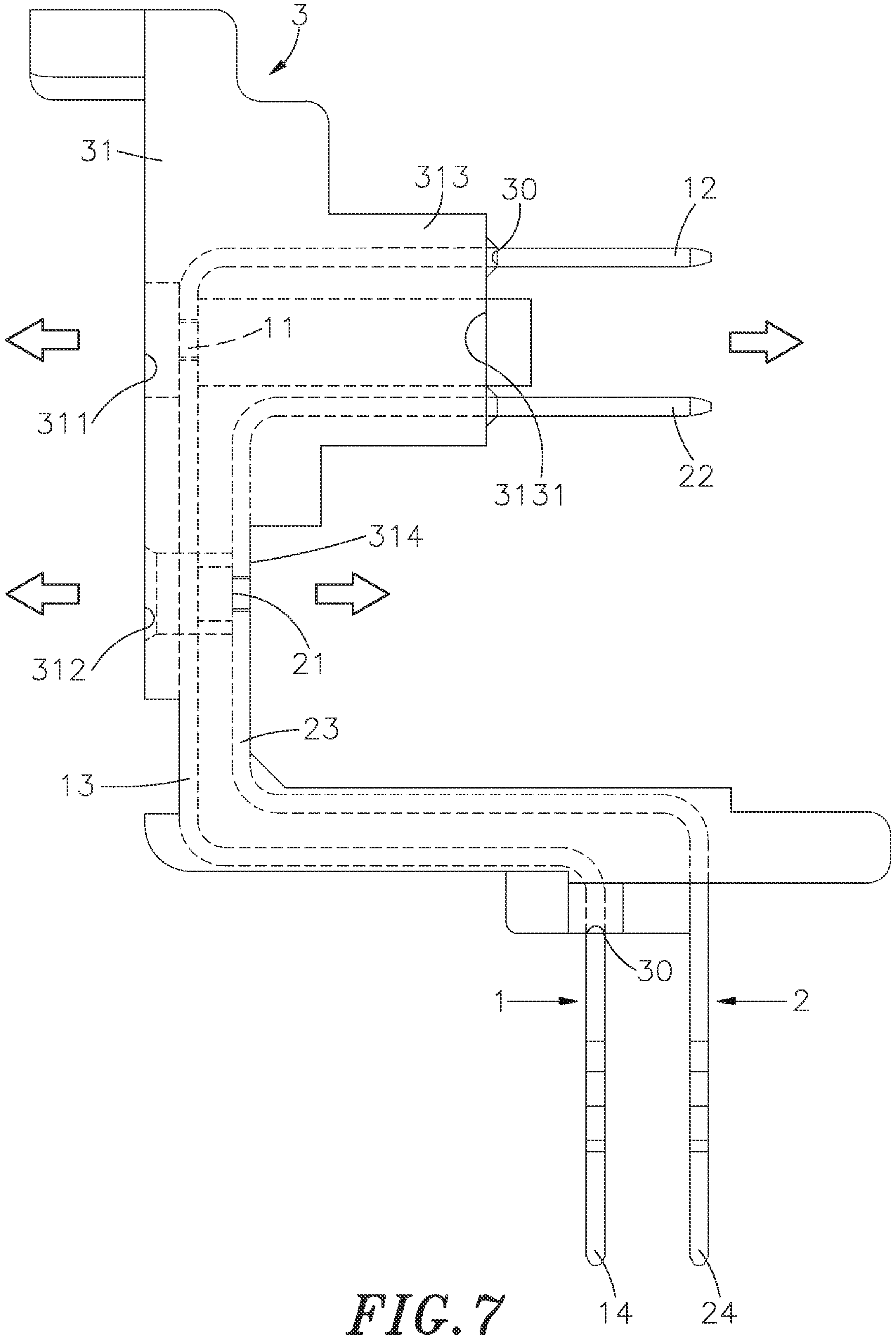
FIG. 7 is a schematic diagram of waste removal of the electrical connector of the present invention.

Please refer to FIGS. 4-7, where FIG. 4 is a fixed state diagram of the first and second terminal sets of the present invention before the insert molding, FIG. 5 is a top view of the electrical connector of the present invention before cutting the first and second material bridges, FIG. 6 is a top view of the electrical connector of the present invention after cutting the first and second material bridges and FIG. 7 is a schematic diagram of waste removal of the electrical connector of the present invention.

The first terminal set 1 and the second terminal set 2 are fixed by a preset fixing fixture (not shown). The second terminal set 2 is placed on the bottom side of the first terminal set 1 with a gap apart. The plural second material bridges 21 are paired with the bottom side of the plural dodging spaces 130 located in the first terminal set 1 so that the plural first and second material bridges (11, 21) of the first terminal set 1 and the second terminal set 2 are designed to have a staggered structure of upper and lower layers (as shown in FIG. 4). Then, the insulating body 3 is molded outside the first terminal set 1 and the second terminal set 2 at the same time by using the insert molding process. The top surface of the insulating body 3 is provided with a plurality of first punching holes 3110 that expose the plurality of first material bridges 11, and a plurality of second punching holes 312 that are located on one side of the plurality of first punching holes 3110 and expose the plurality of second material bridges 21 (as shown in FIG. 5). Then, use the preset cutting tool to extend into the first and second punching holes (3110, 312) from top to bottom, and simultaneously cut the plurality of first material bridges 11 and the plurality of second material bridges 21 (as shown in FIG. 6). The waste formed by the cut first material bridges 11 is eliminated through the corresponding waste grooves 3131 and the first punching holes 3110. On the contrary, the waste formed by the cut second material bridges 21 is eliminated through the waste area 314 and the second punching holes 312 (as shown in FIG. 7). In this way, it makes the multiple terminals of the first terminal set 1 and the second terminal set 2 independent and without electrical connection, thereby achieving the purpose of reducing the development and manufacturing time of a set of molds by half.

From the disclosure of the above-mentioned FIGS. 1 to 7, it can be understood that the present invention is a structure of an electrical connector, which comprises: a first terminal set, a second terminal set, and an insulating body. The first terminal set comprises a plurality of terminals and a plurality of first material bridges forming electrical connections between the terminals, and each terminal extends from the adjacent first material bridge to one side with a first welding portion and to the other side with a first connecting portion and then a first butting portion, and the first connecting portion is horizontally bent to provide a dodging space. The second terminal set comprises a plurality of terminals and a plurality of second material bridges forming electrical connections between the terminals, and each terminal extends from the adjacent second material bridge to one side with a second welding portion and to the other side with a second connecting portion and then a second butting portion. The second terminal set is disposed on the bottom side of the first terminal set at a distance from each other, and the second material bridges are located on the bottom side of the dodging spaces. The insulating body is formed by inserting the first terminal set and the second terminal set into the corresponding plurality of terminal slots by insert molding. The top surface of the insulating body is provided with a plurality of first punching holes that expose the first material bridges, and a plurality of second punching holes that are located on one side of the first punching holes and expose the second material bridges. Use a preset cutting tool to cut the first material bridges and the second material bridges simultaneously from top to bottom and carry out waste removal, so that the terminals of the first terminal set and second terminal set are independent and do not produce electrical connections, hereby achieving the purpose of reducing the development and manufacturing time of a set of molds by half. The present invention is applied in the field of electrical connector manufacturing and has great practicability, so a patent application is filed to seek patent protection.

The above is only a preferred embodiment of the present invention, and therefore does not limit the scope of the patent of the present invention. Therefore, all simple modifications and equivalent structural changes made by using the contents of the description and drawings of the present invention should be similarly included within the scope of the patent of the present invention.

What the invention claimed is:

1. An electrical connector, comprising:

a first terminal set comprising a plurality of first terminals and a plurality of first material bridges forming electrical connections between said first terminals, each said first terminal extending from the adjacent said first material bridge to one side with a first welding portion and to the other side with a first connecting portion and then a first butting portion, each said first connecting portion being horizontally bent to provide a dodging space;

a second terminal set comprising a plurality of second terminals and a plurality of second material bridges forming electrical connections between said second terminals, each said second terminal extending from the adjacent said second material bridge to one side with a second welding portion and to the other side with a second connecting portion and then a second butting portion, said second terminal set being disposed on a bottom side of said first terminal set at a distance from each other, said second material bridges being located on a bottom side of said dodging spaces; and an insulating body formed by inserting said first terminal set and said second terminal set into corresponding plurality of terminal slots by insert molding, said insulating body having a top surface thereof provided with a plurality of first punching holes that expose said first material bridges, and a plurality of second punching holes that are located on one side of said first punching holes and expose said second material bridges allowing a preset cutting tool to be used to cut said first material bridges and said second material bridges simultaneously from top to bottom and carry out waste removal, so that said first terminals of said first terminal set and said second terminals of said second terminal set are independent without producing electrical connections.

2. The electrical connector as claimed in claim 1, wherein said insulating body comprises a horizontal portion with said top surface of said insulating body formed thereon to provide said first punching holes and said second punching holes, an extension block located on a bottom side of said horizontal portion and covering a partial area of said first welding portions and a partial area of said second welding portions, a row of waste grooves located on said extension block on a bottom side of said first punching holes, a waste area formed on a bottom side of said horizontal portion corresponding to said second punching holes and a vertical portion bent downward from one side of said horizontal portion and provided with said terminal slots extending to said extension block for receiving said first terminals and said second terminals, said first butting portions of said first terminal set and said second butting portions of said second terminal set protruding from an outer wall of said vertical portion.

3. The electrical connector as claimed in claim 1, wherein said insulating body forms a recess outside said first punching holes; said first punching holes are rectangular through holes.

4. The electrical connector as claimed in claim 1, wherein said second punching holes are round through holes.

5. The electrical connector as claimed in claim 1, wherein each said first terminal of said first terminal set is bent and extended downward from the adjacent said first material bridge to one side to form the respective said first welding portion, and each said first terminal of said first terminal set extends from the adjacent said first material bridge to the other side with the respective said first connecting portion, the respective said first connecting portion is bent downward and extends horizontally to form the respective said first butting portion, and the end of the respective said first butting portion forms an oval bead structure.

6. The electrical connector as claimed in claim 1, wherein each said second terminal of said second terminal set is bent and extended downward from the adjacent said second material bridge to one side to form the respective said second welding portion, and each said second terminal of said second terminal set extends from the adjacent said second material bridge to the other side with the respective said second connecting portion, the respective said second connecting portion is bent downward and extends horizontally to form the respective said second butting portion, and the end of the respective said second butting portion forms an oval bead structure.

* * * * *